Dec. 23, 1969  T. T. FENDER  3,485,116
METHOD AND APPARATUS FOR FORMING SECTIONAL SPIRAL FLIGHTS
Filed April 24, 1967  10 Sheets-Sheet 1

INVENTOR
TRACY T. FENDER

BY

ATTORNEY

Dec. 23, 1969     T. T. FENDER     3,485,116
METHOD AND APPARATUS FOR FORMING SECTIONAL SPIRAL FLIGHTS
Filed April 24, 1967     10 Sheets-Sheet 2

INVENTOR.
TRACY T. FENDER
BY
ATTORNEY

Dec. 23, 1969 T. T. FENDER 3,485,116
METHOD AND APPARATUS FOR FORMING SECTIONAL SPIRAL FLIGHTS
Filed April 24, 1967 10 Sheets-Sheet 3

INVENTOR.
TRACY T. FENDER
BY
ATTORNEY

Dec. 23, 1969  T. T. FENDER  3,485,116
METHOD AND APPARATUS FOR FORMING SECTIONAL SPIRAL FLIGHTS
Filed April 24, 1967  10 Sheets-Sheet 4

INVENTOR
TRACY T. FENDER

BY

ATTORNEY

INVENTOR.
TRACY T. FENDER

United States Patent Office 3,485,116
Patented Dec. 23, 1969

3,485,116
METHOD AND APPARATUS FOR FORMING SECTIONAL SPIRAL FLIGHTS
Tracy T. Fender, R.R. 1, Box A27, Chapmanville, W. Va. 25508
Filed Apr. 24, 1967, Ser. No. 633,273
Int. Cl. B21k 5/02; B23p 15/00; B21d 1/04
U.S. Cl. 76—2       8 Claims

ABSTRACT OF THE DISCLOSURE

The patent specification and drawings disclose a method and means for forming auger flights on a semi-automatic basis. The method and means include a framework for mounting a pulling element to which is adapted to be clamped a centrally bored flat circular disc having a cut-out extending from the central bore to the outer periphery of the disc. The outside diameter of the disc has been previously calculated to be employed in the formation of a flight as well as the diameter of the central bore, and following the clamping thereof, as aforesaid, the pulling element is actuated by any force means, such as hydraulic or pneumatic pressures to effect a gradual bending or stretching of the circular disc and to cause the same to attain a spiral formation. The spiral shape is attained by exerting a straight outward pull on the edges of the cut out portion of the disc and to pull the same to a distance so as to form the spiral to the desired length and pitch.

The means for deforming a flat circular plate into a spiral design is designed to form sectional spiral flights of differing outer diameters and differing bore diameters with but minor adjustments made thereto.

BACKGROUND OF THE INVENTION

The present invention relates to a method and apparatus employed in the formation of sectional spiral flights.

The sectional spiral flights referred to herein are of the type which are adapted to encircle a circular central shaft and to be secured thereto in any manner, as by welding, brazing, etc. Since it is known that augers vary from one another such as the external diameter of the flights forming the auger, the size of the central shaft to which they are secured, etc., it becomes imperative that some method and means be devised to form such flights in an economical manner particularly when only a certain section of an auger needs replacement and it is more feasible economically to repair the damaged section of the auger than to replace the entire auger. It should be pointed out at this time that while I refer to the replacement of flights on augers, the method and apparatus defined herein is equally applicable in the formation of complete augers as well as in the formation or repair of like screw structures such as screw conveyors, endless screws, and like outwardly spiralled structures.

SUMMARY OF THE INVENTION

The present invention relates to a novel method and apparatus for forming sectional spiral flights for augers, screw conveyors, and the like to be used as replacements for damaged sections of an auger or in the formation of completely new augers or other similar type screw conveying mechanisms.

It is a known fact that augers and/or screw conveying members, particularly those employed in earth working such as in mining operations, undergo severe stress and strain, particularly on the flight portions forming the auger or screw with the result that quite frequently such flights are damaged or worn to a point where they no longer operate in their desired manner by reason of the damage inflicted thereon during use, and when this condition is present, it behooves the operator of the mechanism employing such screw conveyors to remove the damaged conveyor and either replace the entire screw conveyor with a new conveyor or remove the damaged conveyor and submit the same to a proper installation for the replacement of the worn parts which are usually some sections of the flights. As can be appreciated, particularly in the mining industry where motorized equipment is employed in the mining operation, a plurality of such screw conveyors are employed for cutting into and removing coal from a shallow vein and oftentimes such veins extend a substantial distance from the initial point of entry of such screw cutting and conveying mechanism with the result that oftentimes such cutting and conveying mechanism may extend for possibly one hundred or more feet in length. Therefore, it can be appreciated that it is much more economical to repair damaged or worn sections of such conveyor mechanism than to replace the entire unit. Usually the flights of the conveyor are the only parts damaged or worn during usage whereas the shaft upon which the flights are mounted are capable of re-use after the placement thereon of replacement flights.

The method heretofore employed in the making of flights comprised a die and press and since augers and screw conveyors have different flight pitches as well as different sized shafts mounting the flights, it becomes necessary for one employed in the repair of such augers or screw conveyors to equip himself with a large number of such dies in order to enable him to fabricate a new flight section which will correspond with the damaged flight which is to be replaced. Thus, it can be appreciated that a large number of dies must be obtained and maintained ready for use in the fabrication of different size flights. Obviously, such dies are expensive and are capable of reproducing only one type or size flight.

With the above in mind, it is the primary object of the present invention to provide a novel method and apparatus employed in the formation of sectional flights for augers and like screw mechanisms.

Another object of the present invention is to provide for a novel manner of forming sectional flight elements employed with augers and like screw conveying mechanism.

Another object of the present invention is to provide for a structure which is capable of forming any number of different pitch sectional flights which will permit the flights to be adapted to various size shafts to which the flights are affixed.

Another object of the invention is to provide for a structure which is capable of deforming a flat circular disc and to cause the same to assume a spiral formation which forms one-half the area of one full flight section.

Another object of the present invention is to provide an apparatus capable of mounting thereon an auger or screw conveyor shaft and to simultaneously form a section of a spiral flight of desired outside diameter and to secure said formed flight directly onto the said shaft following the formation thereof and to secure the same in proper position on the shaft as by welding, brazing or other known methods of joining metal pieces together.

Another object of the invention is to provide a pulling mechanism which is adapted to operate in conjunction with a flat circular disc having a central bore and a slot extending therefrom to the outer periphery thereof to pull said disc radially and outwardly to form a spiral formation.

Another object of the invention is to utilize a flat circular disc of metal or of any other suitable material possessing the capability of being bent from a flat shape into a spiral formation by exerting a pull on certain parts of the disc.

Another object of the invention is to provide a structure for forming sectional spiral flights which comprise a pair of work engaging clamps to which a slotted disc having a central bore is secured thereto and a pull is exerted on said clamps to deform the disc and permit the same to assume a spiral formation.

An important object of the present invention is the provision of simple and effective methods by which such sectional spiral flights may be manufactured.

The foregoing and other objects are accomplished by the present invention which, for illustrative purposes, is shown in some particularity in the accompanying drawings without, however, limiting the invention to such particular illustrative structures.

PREFERRED EMBODIMENTS OF THE INVENTION

Referring now to the drawings, there is disclosed by reference numeral 10 a generally rectangularly shaped frame comprising uprights 11 to which are suitably secured horizontally extending cross bars 12 and 13. Suitable bracing for the aforesaid framework may be provided in the form of angle plates 14 which are secured to the framework in any known manner as by welding, brazing, etc. A center shaft 15 is fixed in any known manner to the frame 10 and mounted thereon for sliding and rotational movements are a pair of housings 16 and 17. Housings 16 and 17 are connected by means of web sections 18 and 19 to support members 20 and 21. The web sections 18 and 19 are secured in any manner to housings 16 and 17 and to the supports 20 and 21 as by welding, brazing, etc. For that matter, housings 16 and 17, webs 18 and 19 and supports 20 and 21 could be formed as an integral unit. Supports 20 and 21 are in the nature of hollow structures and shafts 22 and 23 extend therethrough, thereby forming a swivelling support for the supports 20 and 21. The inner ends of shafts 22 and 23 are formed integral with or otherwise fixed to hanger structures 24 and 25. Thus, it will be seen that the hangers 24 and 25 are free to swivel within the supports 20 and 21 for a purpose to be more fully described hereinafter.

Rotatably mounted on the supports 20 and 21 are generally U-shaped swivel hooks 26 and 27. A tie rod 28 extends from swivel hook 26 and is secured in any manner to an upright 11 as clearly shown in FIGURE 1 of the drawings. Thus, it will be seen that hanger 24 is prevented from any lateral movement with respect to the frame 10 although by reason of shaft 22 extending through support 20 the hanger 24 and its associated parts is capable of rotational or swiveling motion.

Figure 5:
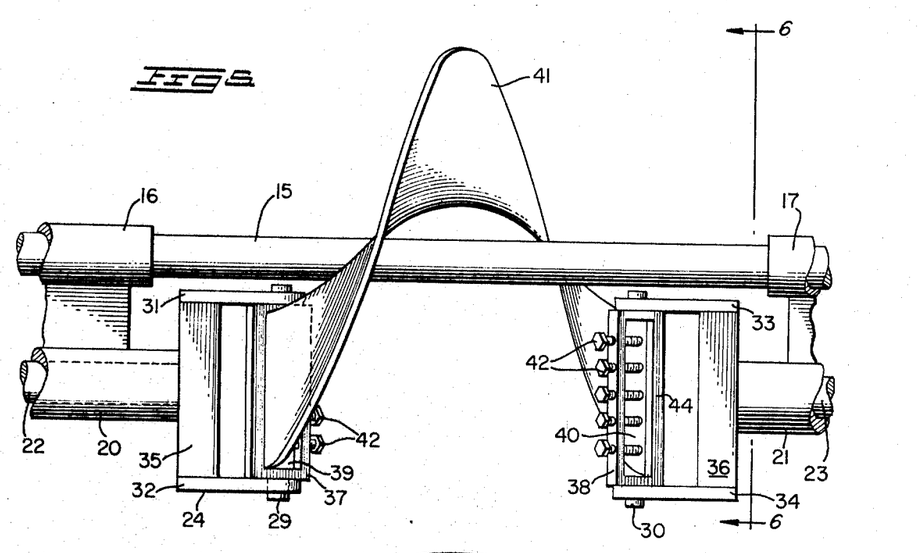
FIGURE 5 is a view similar to FIGURE 3 showing the device in its expanded position in the formation of a sectional spiral flight.

Hangers 24 and 25 comprise generally rectangularly shaped forms as more clearly shown in FIGURE 5 of the drawings and have pivot pins 29 and 30 extending between plates 31, 32, 33 and 34 which are suitably secured to or formed integral with vertically extending cross heads 35 and 36 which form a part of the hanger structures 24 and 25. A pair of clamping elements 37 and 38, one for each hanger structure 24 and 25, are swivelly mounted on pivot pins 29 and 30 as more clearly shown in FIGURE 5 of the drawings. The clamping elements 37 and 38 are of identical structure and comprise a generally rectangularly shaped clamping structure having a slot 39 and 40 formed therein to each receive therein one end of a split disc 41 which is to be employed in the formation of a section of a flight in a manner to be more fully described hereinafter.

Figures 1, 2:
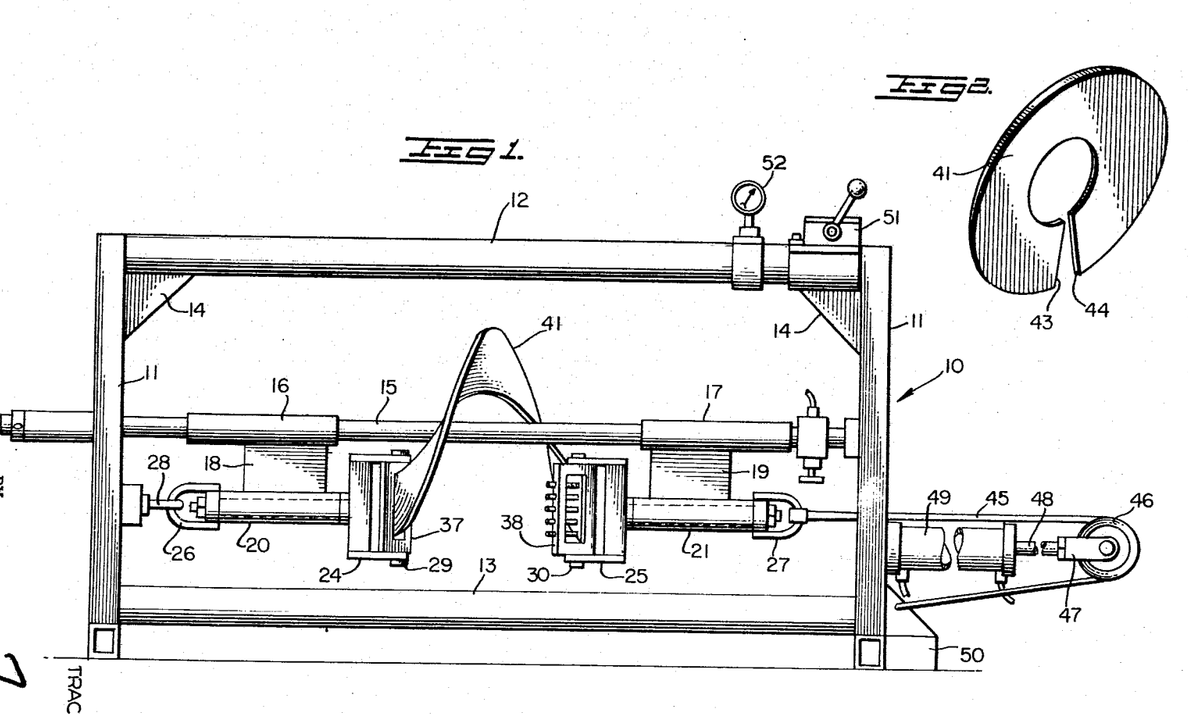
FIGURE 1 is a front elevational view of the present invention.
FIGURE 2 is a perspective view of a blank or disc employed in the formation of a sectional flight.
Figure 3:
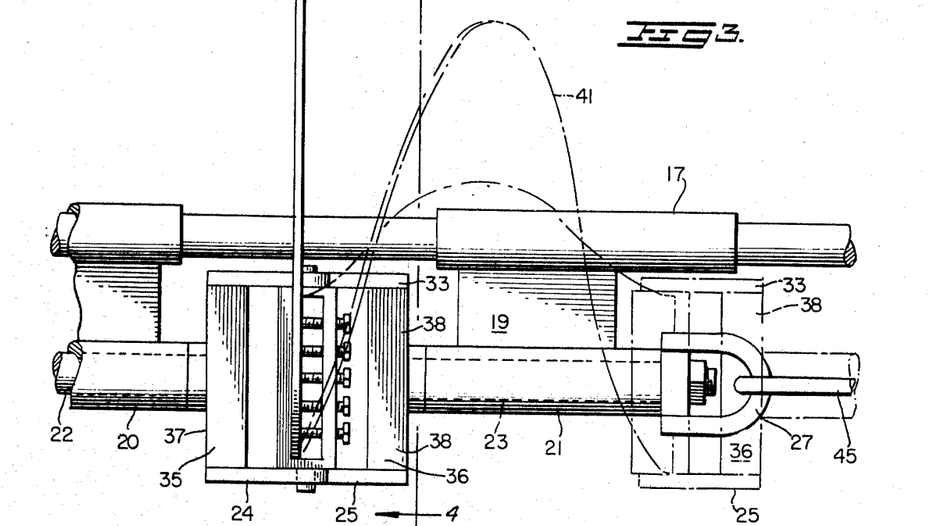
FIGURE 3 is an enlarged fragmentary elevational view of a portion of the apparatus employed in carrying out the invention and as shown particularly in FIGURE 1.

It should be pointed out at this time that the clamp 37 shown at the left hand side in FIGURE 1 and 5 will hereafter be referred to as a stationary clamp whereas clamp 38 shown at the right hand side in FIGURES 1 and 5 will be referred to as the travelling clamp.

Extending within slots 39 and 40 are shown a plurality of bolt members 42 which are threaded in suitable openings formed along one wall of the clamping elements 37 and 38 and are adapted to engage with the edges 43 and 44 of the disc 41 and to retain the same therein during the formation of the sectional flight in a manner to be more fully described hereinafter.

While I have shown threaded members which are adapted to retain the edges of the split disc in proper position within the clamping elements during the formation of the flight, it is obvious that various other type retaining mains may be substituted for the threaded members and function equally as effective in retaining the desc in proper position during the formation of the flight.

Referring again to FIGURE 1, it will be seen that swivel hook 27 has secured thereto in any manner a cable 45 which is trained over a pulley 46 suitably mounted on forked end 47 which extends from one end of a piston rod 48 of cylinder 49. Suitable lines lead to and from the cylinder 49 and are connected to a suitable source of pressure supply in a conventional manner. As seen in FIG- URE 1 of the drawings, cable 45 is secured in any manner to the frame 10 as by attachment to a block 50 which is secured thereto in any manner.

In line connection with the source of pressure supply for the cylinder 49 is a valve operator 51 and gauge means 52. Both the valve operator and gauge may conveniently be mounted on cross bar 12 as shown in FIGURE 1 of the drawings although it is obvious that such mechanisms can be mounted on any other support means on the frame 10. However, since the operator of the device of the instant invention will be in proximity of the frame 10 during the formation of a sectional flight, it is desirable that the auger and valve operater be placed at some convenient location on the frame, for example, such as shown in FIGURE 1 of the drawings. Thus, the operator of the machine may by manipulating the valve mechanism, direct pressure to the cylinder 49 to cause travel of the piston therein and piston rod either to a retracted position or to an extended position when the machine is in operation. The gauge 52 will serve to inform the operator of the machine of the pounds of pressure being applied to the cylinder and to thereby obviate the introduction therein of undesirably high pressures which could be damaging to this portion of the machine.

Having now described the various components depicted in FIGURES 1 through 6, inclusive, of the drawings, there will now be described the manner of operation of the mechanism therein.

First of all, it should be pointed out that the disc 41, of suitable thickness, has been formed with the required outside diameter and likewise the central bore has been formed of the required outside diameter in order to adapt the finished sectional flight to a shaft of known external diameter and the amount of stretch imparted to the disc for deforming the same from its initial flat form to a spiral formation has also been previously calculated.

As explained previously, housings 16 and 17 are mounted for limited rotational movement on shaft 15. The webs 18 and 19 secured to the housings connect with supports 20 and 21 while hangers 24 and 25 are swivelly mounted on shafts 22 and 23 extending through supports 20 and 21. Also, the clamping elements 37 and 38 are pivotally mounted on pivot pins 29 and 30. Thus, it will be seen that with the aforementioned parts so mounted, the clamping elements 37 and 38 can be brought to a position wherein they are side by side, such as shown in full lines in FIGURE 3 of the drawings, with clamp 37 overlying a portion of the clamp 38 which is located directly therebeneath. With the parts in the full line position shown in FIGURE 3, the edges 43 and 44, respectively, are each placed in slots 39 and 40 and secured therein by the threaded bolts 42 provided for this purpose. Following the securing of the disc to the clamps 38 and 39, as aforesaid, the operator of the machine then operates the valve mechanism 51 to direct the flow of a fluid pressure to cylinder 49 which will force the rod 48 and pulley 46 to the right, as viewed in FIGURE 1 of the drawings. Cable 45 will thereupon exert a pull or support 21 and parts associated therewith. As can be appreciated, housing 17 will slide along shaft 15 thus permitting the entire aforesaid assembly to move to the right as viewed in FIGURE 1 of the drawings. As stated previously, support 20 is anchored to uprights 11 and remain stationary when pull is exerted on support 21 although the housing 16 is capable of slight rotational movement on shaft 15 and the shaft 22 is capable of rotational movement within support 20. Clamping element 37 has been described as being pivotally mounted on pivot pin 29 and thus free to assume various positions during the formation of the flight.

Figure 4:
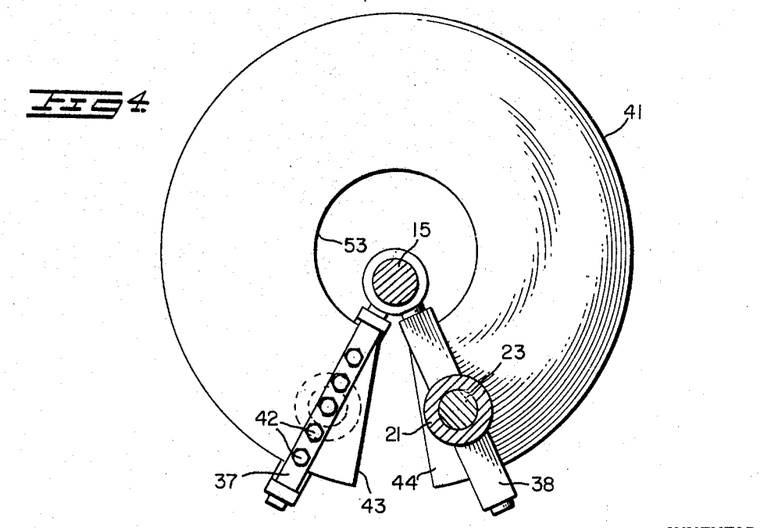
FIGURE 4 is a section taken on line 4—4 of FIGURE 3 looking in the direction of the arrows.

Referring again to FIGURES 3 and 4 of the drawings, the full line position of the parts shown therein disclose the parts of the machine and disc prior to the application of any forces for deforming the same in the formation of a sectional spiral flight. FIGURE 4 of the drawings illustrates the relative position of the clamping elements shown in FIGURE 3 of the drawings. Thus, it will be seen more particularly in FIGURE 4 of the drawings that with the disc 41 secured to the clamping elements 37 and 38 and prior to the application of any forces thereto in the aforesaid manner, the central bore 53 of disc 41 is disposed off-center with respect to the shaft 15. As can be appreciated, when a flat-circular disc having a centrally located bore is deformed in the formation of a spiral section, both the external diameter of the disc and the diameter of the central bore will lessen, depending on the amount of pull or stretch imparted on the disc. Thus, when an operator of the aforesaid mechanism is called upon to duplicate a section of a flight which has to be replaced on an existing screw conveyor, he first calculates the size of the flight section to be replaced, both as to the outside diameter and pitch of the replacement flight as well as the size of the central bore for the replacement part and with this calculation having been obtained, the operator then proceeds to clamp the split disc to the clamping elements, as aforesaid, and through the mechanism previously described, initiates the start of the pulling of the disc by forces being applied thereto through the aforesaid hydraulic or pneumatic pressure acting on cylinder 49 forcing the travelling clamp 38 and disc held therein to move to the right as viewed in FIGURE 1 of the drawings. When the disc has been stretched or deformed to the desired extent in the formation of the flight, the operator then shuts off the pressure forces on the cylinder 49 and the formed flight is then removed from the clamping elements and the operation repeated until the desired number of flight sections have been formed.

Figure 6:
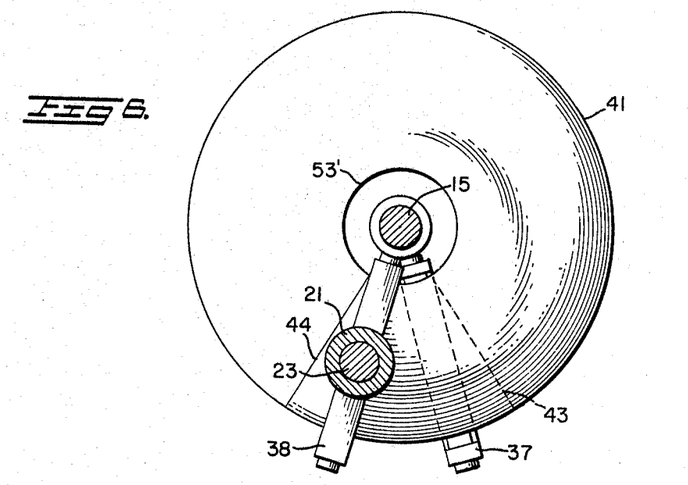
FIGURE 6 is a view taken on line 6—6 of FIGURE 5 looking in the direction of the arrows.

Referring now to FIGURES 4 and 6 of the drawings, it will be observed that central bore 53 as viewed in FIGURE 4 is off-center with respect to shaft 15. This is the position the disc assumes with respect to the shaft 15 prior to the application of any pulling forces thereon. The bore 53' shown in FIGURE 6 of the drawings is now concentric with the central shaft 16 and this concentricity was acquired during the pulling of the disc in the formation of the section of the flight. As can be appreciated, when a circular disc is pulled to form a spiral section, both the outside diameter of the disc and the diameter of the central bore therein diminishes as the stretching occurs. Also, as seen in FIGURES 4 and 6 of the drawings, clamping members 37 and 38 assume different positions during the stretching of the disc in the formation of a section of a flight. This is due to the fact that the clamping members are swivelled in their supports and as the disc is pulled in the manner aforesaid, the clamping members are free to follow the line of bend imparted to the disc thereby distributing the strain along the pitch line evenly thus producing a flight section having a true pitch throughout the entire area thereof.

In the formation of a flight section, when the same has been pulled to the desired extent, the edges 43 and 44 of the disc are now disposed in overlapping relationship as shown in FIGURE 6 of the drawings. The clamping elements are free to swivel on shafts 22 and 23 and housings 16 and 17 are likewise free for rotational movement on shaft 15. Thus, the clamps are free to assume the position shown in FIGURE 6 of the drawings upon completion of the formation of the flight with the edges 43 and 44 of the disc in overlapped relationship. Thus, by reason of the swiveling arrangement of the parts previously described, all of the strain imparted thereto in the formation of a flight section is evenly distributed with attendant formation of a flight having a true pitch throughout the entire area.

Figure 8:
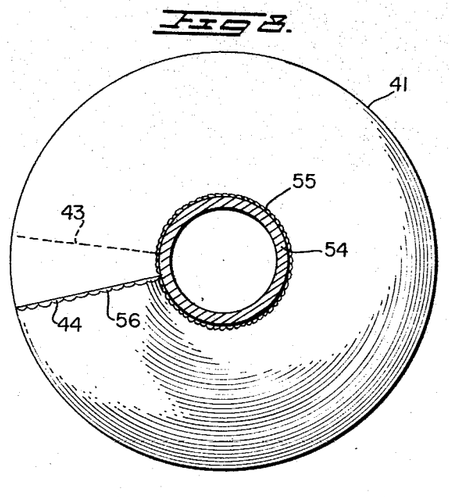
FIGURE 8 is a view taken on line 8—8 of FIGURE 7 looking in the direction of the arrows.
Figure 9:
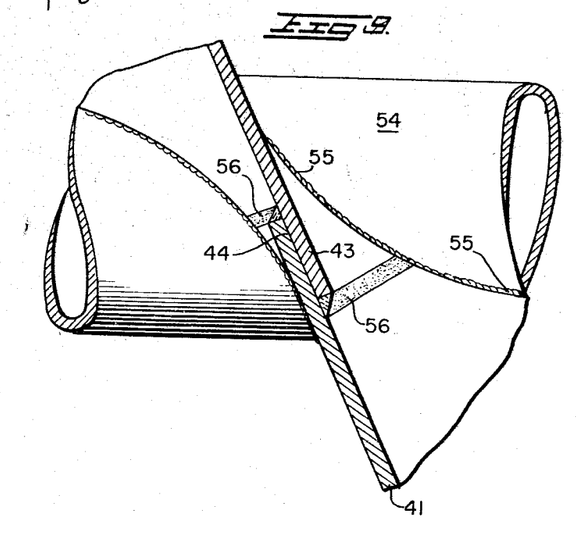
FIGURE 9 is an enlarged detailed fragmentary sectional view of the splicing of the sectional flights on an auger or screw conveyor shaft.

Having formed the flight section in the manner aforesaid, the same is removed from the clamping elements and then applied to a conveyor shaft 54 and secured thereto as by a line of weld 55. The flight ends or edges 43 and 44 are arranged in overlapping relationship on the shaft 54 as more clearly shown in FIGURES 8 and 9 of the drawings and are secured to one another in any known manner as by welding, brazing, etc., such being indicated by reference numeral 56 in said figures.

Figure 10:
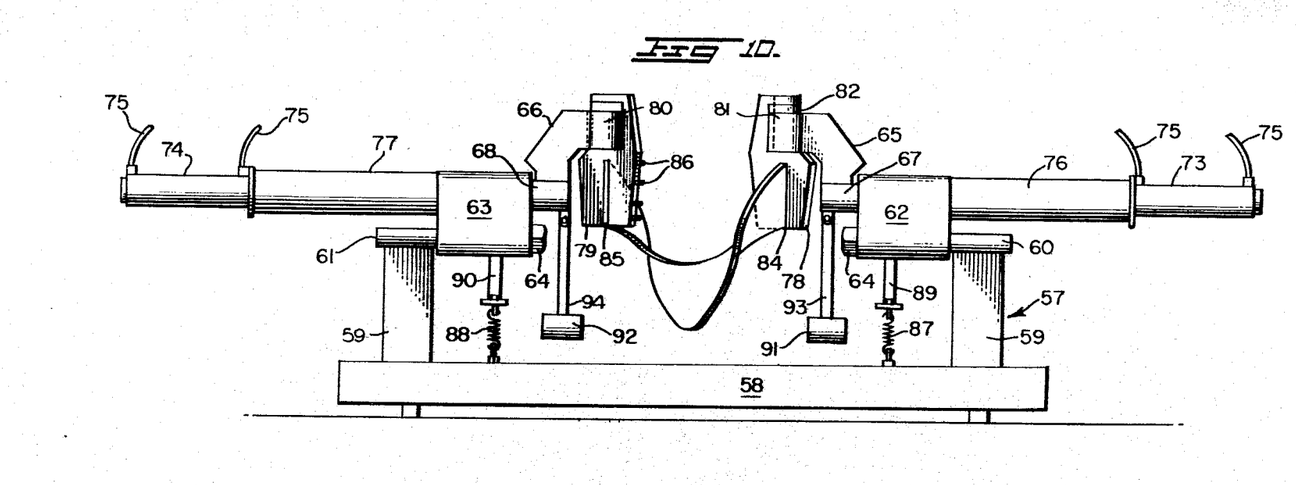
FIGURE 10 is a front elevational view of a modified form of the apparatus of the present invention.
Figure 11:
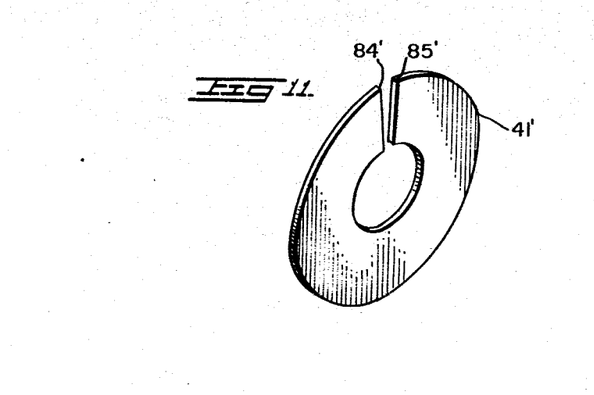
FIGURE 11 is a perspective view of a blank or disc which is adapted to be employed with the structure shown in FIGURE 10 of the drawings.
Figure 12:
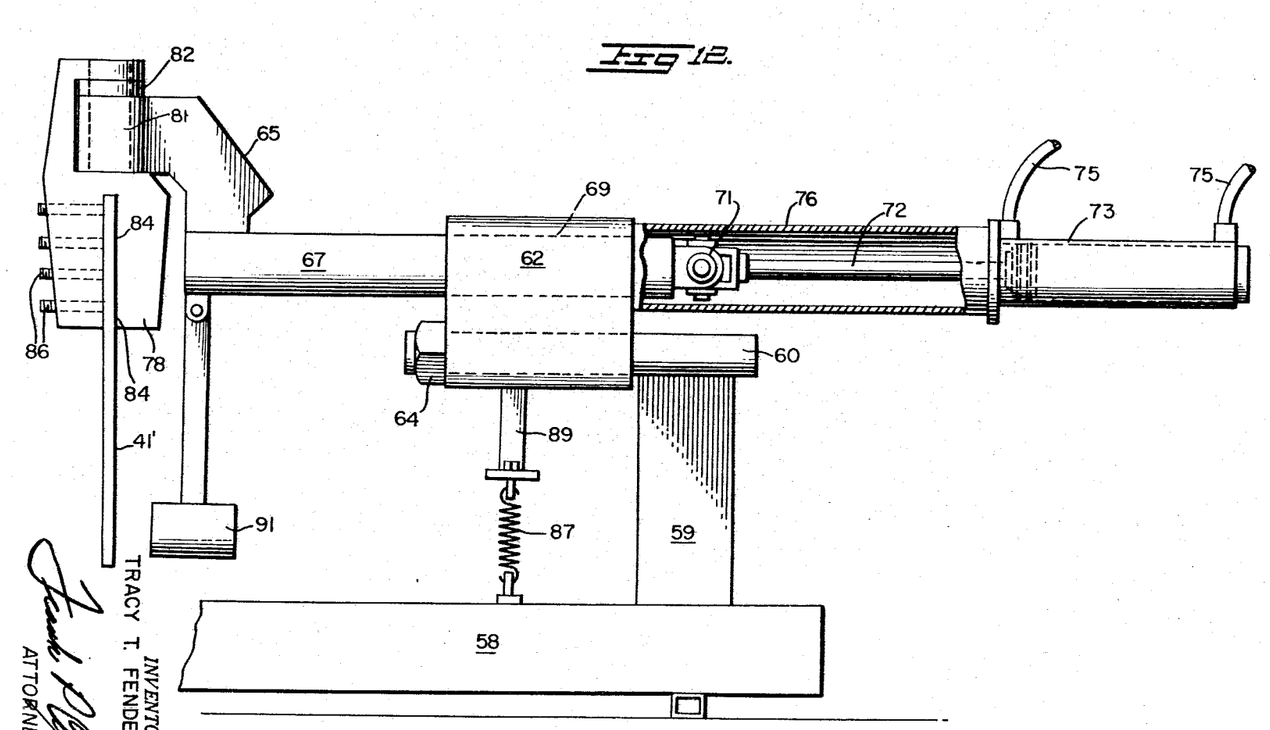
FIGURE 12 is an enlarged fragmentary section of one of the clamping members and its associated parts forming a portion of the structure shown in FIGURE 10 of the drawings.

Referring now to FIGURES 10 to 14, inclusive, of the drawings, there is disclosed therein a slightly modified form of a flight former which is adapted to deform or stretch a flat disc member 41' shown at FIGURE 11 into a flight section. In this modification of the invention, there is provided a frame 57 comprising a base 58 and uprights 59. Secured to uprights 59 are shafts 60 and 61. The shafts may be formed integral with the uprights 59 or secured thereto in any manner as by welding, brazing, and the like. A housing 62 is swively mounted on shaft 60 and a like housing 63 is likewise mounted on shaft 61. Shafts 60 and 61 are provided with a short section of external threads and nuts 64 are employed for retaining the housings 62 and 63 on their respective shafts. A pair of clamp hangers are shown at 65 and 66 and are formed integral with or otherwise suitably secured to rod members 67 and 68, respectively, which extend through bores 69 and 70 formed in the upper portion of housings 62 and 63. Rods 67 and 68 are secured in any manner as by a swivel connection 71, only one being shown in the drawings, to a piston rod 72 which extends within cylinders 73 and 74 extending on either side of the clamp hangers 65 and 66. Suitable lines 75 lead to and from a suitable source of pressure for operation of the flight former in a manner to be more fully described hereinafter.

As described in FIGURE 1 of the drawings, a suitable valve mechanism and pressure dial may be associated with pressure lines 75 of this modification of the invention and may be conveniently located on the framework for easy access by the operator of the machine.

Figure 13:
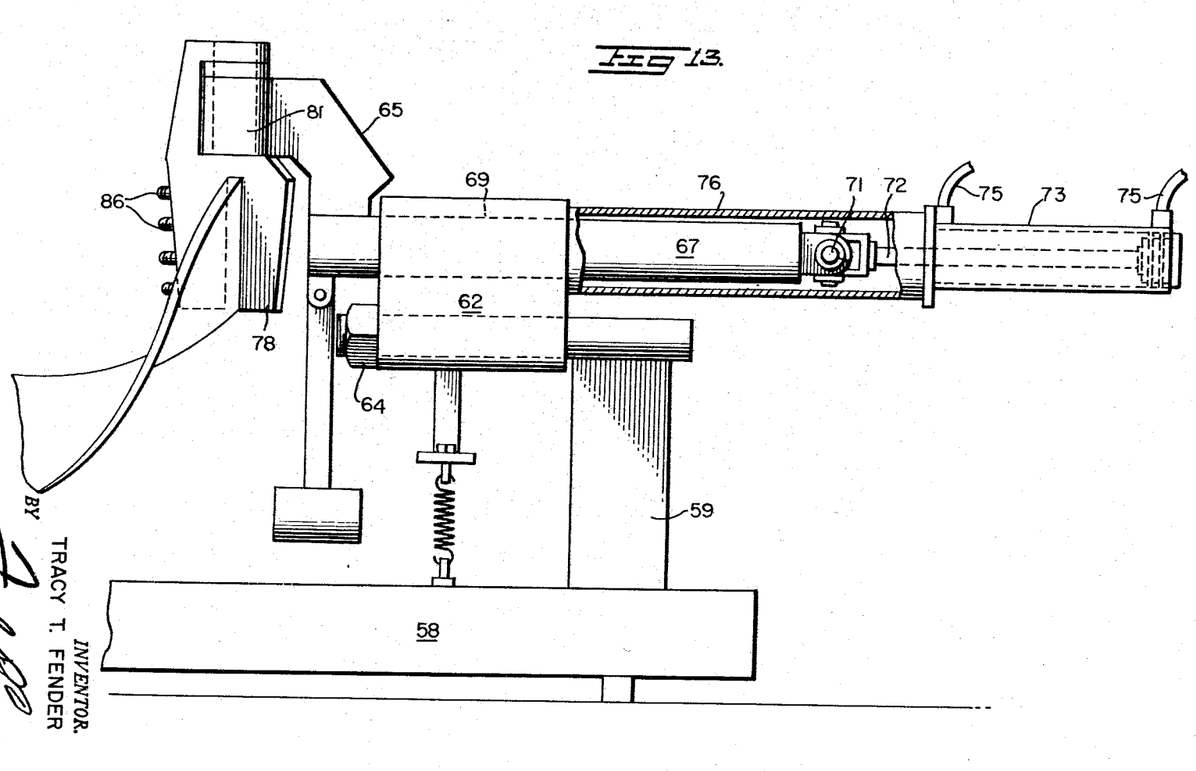
FIGURE 13 is an enlarged fragmentary section of one portion of the structure shown in FIGURE 10 of the drawings, disclosing the relative position of the parts thereof following the formation of a sectional flight.
Figures 14, 19:
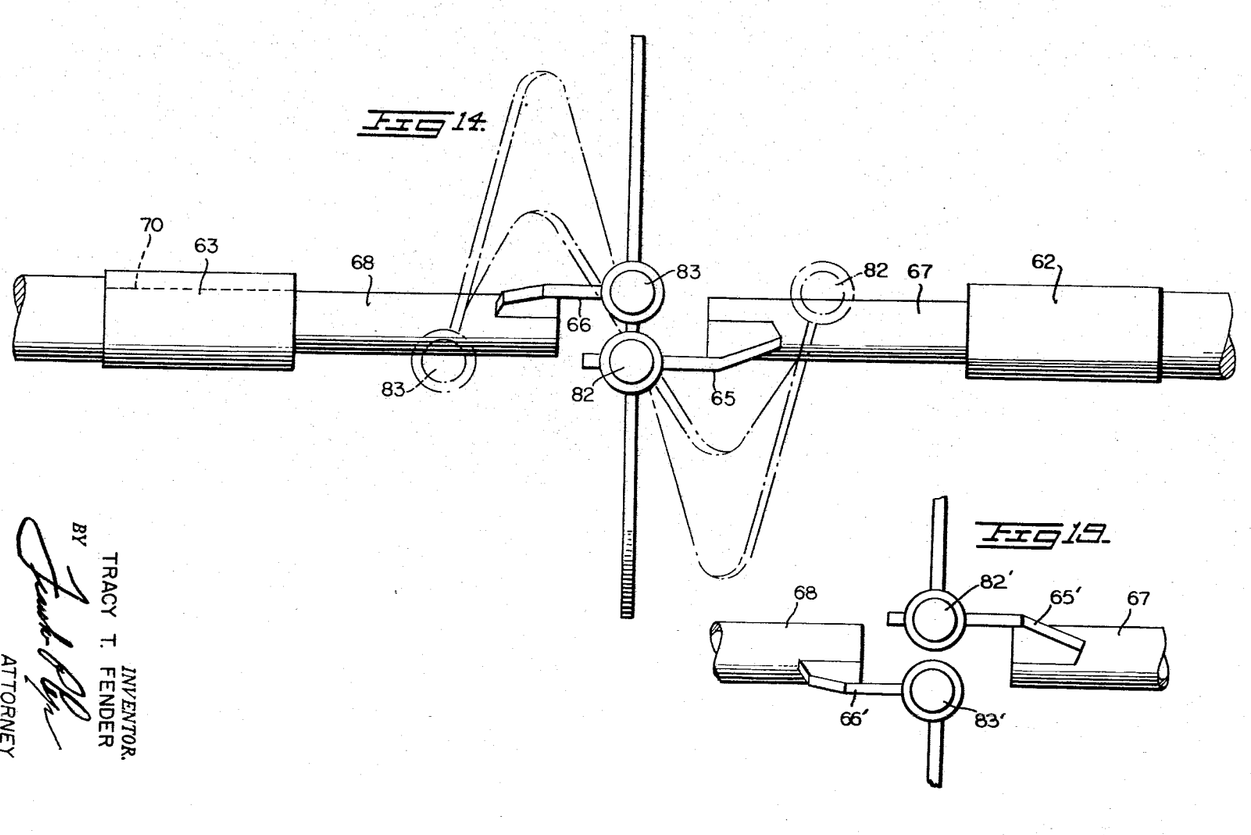
FIGURE 14 is an enlarged fragmentary top plan view of the clamping members of the apparatus shown in FIGURE 10 of the drawings, the full lines showing the parts as they appear prior to the formation of a left hand flight and the dotted line indicating the position of the same parts following the formation of a sectional flight.
FIGURE 19 is a fragmentary top plan view of the clamping members when a right hand flight is to be formed.

Protective housings 76 and 77 extend over the piston rods 72 for the cylinders 73 and 74 and are secured in any manner to housings 62 and 63 as shown in FIGURE 13 of the drawings.

Clamps 78 and 79 depend from clamp hangers 65 and 66 in the manner shown more clearly in FIGURE 10 of the drawings. Tubings 80 and 81 are formed integral with or otherwise suitably secured to clamp hangers 65 and 66. Shafts 82 and 83 are formed integral with or otherwise secured to clamps 78 and 79 and are adapted to engage with and are mounted for rotation within the tubings 80 and 81. Clamps 78 and 79 are each provided with a slot 84 and 85 into which the edges 84' and 85' of the disc 41' are adapted to be fitted and retained therein as by bolt members 86 when a flight section is to be formed from the flat disc 41'.

It will be noted that rod members 67 and 68 and associated parts, are swively mounted in bores 69 and 70 formed in housings 62 and 63. Thus, in order to insure the upright positioning of these parts as shown in FIGURE 10 of the drawings, springs 87 and 88 are suitably secured to the frame base 58 and to straps 89 and 90 which are secured in any manner to housings 62 and 63. Also, weighted members 91 and 92 depend from rod members 67 and 68 and are secured thereto in any manner as by straps 93 and 94. Thus, the weights and springs will serve to maintain the clamp hangers 65 and 66 on a vertical line with respect to the base 58 and likewise, the springs 87 and 88 will maintain the housings 62 and 63, also on a vertical line with respect to the base.

Having described the various components shown in FIGURES 10 to 14, inclusive, of the drawings, there will now be described the manner of operation thereof.

A disc of suitable thickness and with the required outside diameter is selected and formed with a centrally located bore which is also of the required diameter so as to enable the same to fit a shaft of a known external diameter following the formation of the flight section, as described previously in the method of operation with respect to FIGURES 1 through 6 of the drawings.

Figure 7:
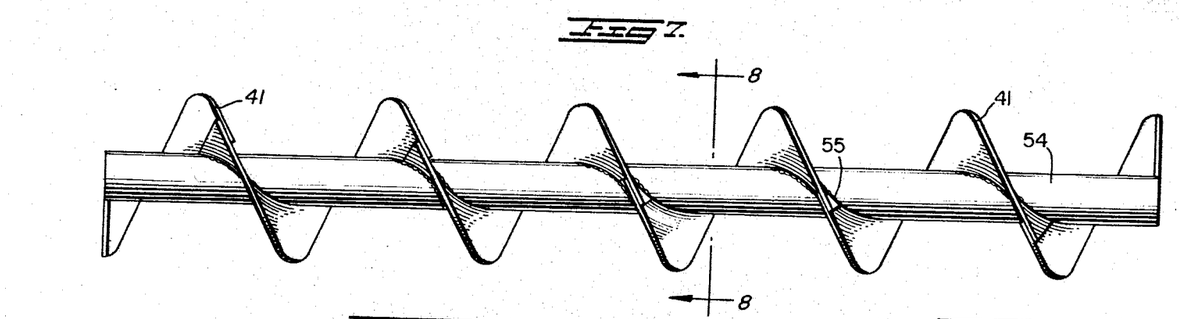
FIGURE 7 is an elevational view of an assembled auger or screw conveyor formed with joined sectional spiral flights.

Thereupon, the edges 84' and 85' are engaged in slots 84 and 85 of the clamps 78 and 79 and secured therein as by bolts 86. When the disc is secured to the clamps in the manner aforesaid, the clamps and clamp hangers are in overlapped relationship with one another as shown in full lines in FIGURE 14 of the drawings. Next, the operator of the mechanism directs the flow of a pressure medium to the cylinders 73 and 74 thereby retracting the piston rods 72 within their respective cylinders and in so doing, the rod members 67 and 68, with clamp hangers 65 and 66 mounted thereon, are caused to move outwardly thereby applying a deforming force on the disc held therebetween. As the pulling forces are applied to the clamps, as aforesaid, the disc will be pulled at its respective edges, thus reducing the outside diameter of the disc and likewise the diameter of the central bore, and this pulling force will continue until such time as the desired flight pitch has been attained. Thereupon, the pressure medium is released and the formed flight section is removed from the clamps and then applied to a shaft and secured thereto in the manner previously described with respect to FIGURES 7, 8 and 9 of the drawings.

During the formation of the flight section, the swiveled clamping members 78 and 79 along with the swiveled rod members 67 and 68 and the swiveled housings 62 and 63 permit for clamping members 78 and 79 and its associated parts, aforesaid, to follow the line of bend imparted to the disc and to thereby distribute the strain along the pitch line evenly thus producing a flight section having a true pitch throughout the entire area thereof, as described previously with respect to the form of the invention shown in FIGURES 1 to 6, inclusive, of the drawings.

Figure 15:
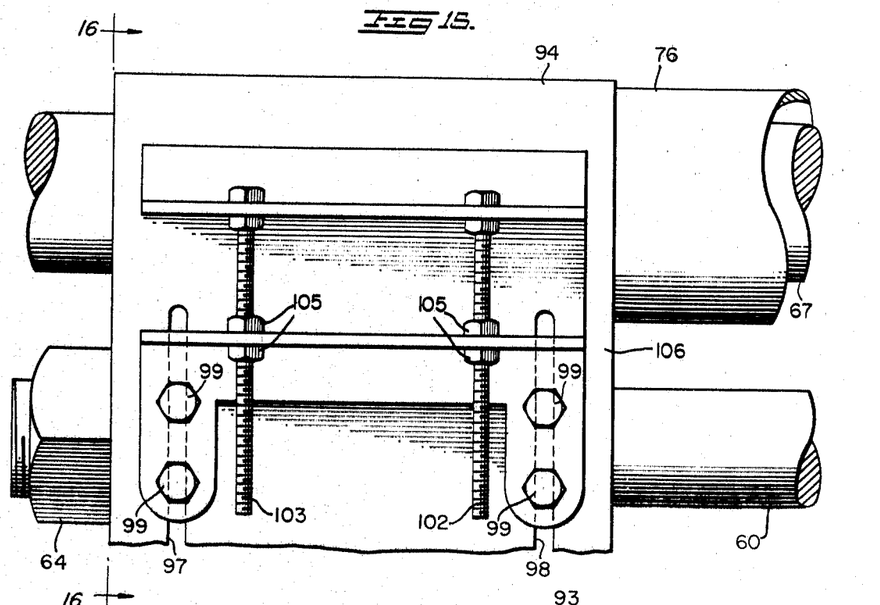
FIGURE 15 is an enlarged fragmentary view showing an adjustable means which can be employed with the structure of FIGURE 10 of the drawings.
Figure 16:
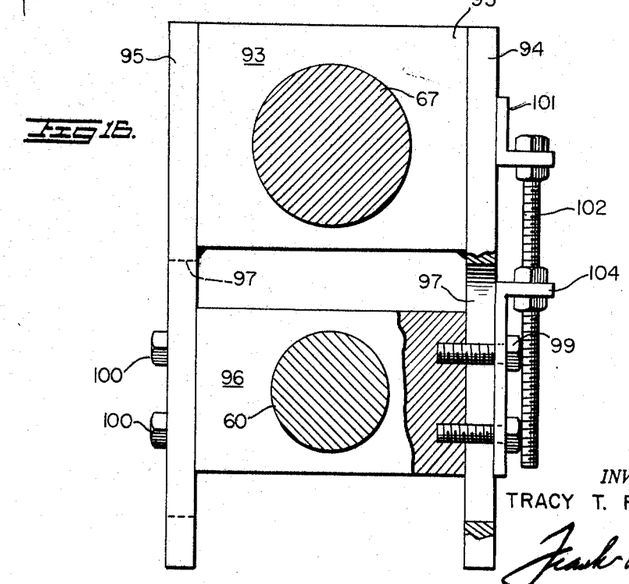
FIGURE 16 is a section taken on line 16—16 of FIGURE 15 of the drawings.

FIGURES 15 and 16 disclose an arrangement whereby the apparatus shown in FIGURES 10 to 14, inclusive, of the drawings, can be easily adapted to the formation of flight sections to fit various external diameter size shafts to which the flights are to be applied when constructed with the apparatus of the present invention. Shown at FIGURE 15 of the drawings is a unit which is adapted to replace the housings 62 and 63 of FIGURE 10 of the drawings and caused to operate in somewhat the same manner, that is, shaft 60 is swively mounted therein and shaft 67 is likewise swively mounted so as to enable these parts to operate in the same manner as set forth in the description of the invention with respect to FIGURES 10 to 14, inclusive, of the drawings.

FIGURE 15 shows a block 93 which is adapted to surround housing 76 and to be suitably fixed thereto in any known manner. A pair of plates 94 and 95 are secured in any manner to block 93 and extend downwardly therefrom and are secured in any known manner to a fixed block 96 which encircles the shaft 60 which is fixed to upright 59. While only one such unit is shown in FIGURE 15 of the drawings, it will be understood that a like formed unit will be substituted for the housing 63 in FIGURE 10 to encircle shaft 61 and adapted to operate in the manner described more fully hereinafter in adapting the mechanism of FIGURE 10 to form flight sections for various size shafts to which they will be applied following completion of the flight.

Plates 94 and 95 are each provided with a pair of aligned slots 97 and 98 and screw members 99 and 100 extend therein and engage with stationary or fixed block 96.

An angle bar 101 is fixed to one face of plate 94 and a pair of threaded members 102 and 103 extend downwardly therefrom through suitable openings formed in a lower angle bar 104 which is fixed to block 96. Suitable nuts 105 are threaded on threaded members and as can be appreciated with the present arrangement of parts, block 93 and its associated parts may be adjusted relative to block 96 and fixed shaft 60. Once adjusted to the desired position, the parts may be locked in position by means of the screw 99 in a manner well known in the trade. A gauge 106 can be provided on the face of the plate 94. Since shafts 60 and 61 are each secured or formed integral with uprights 59 and since each form the center line of the flight to be formed, the adjustability of the rod members 67 and 68, with respect to the stationary shafts 60 and 61, permit for the device shown in FIGURE 10 of the drawings to form flights for various size shafts to which they are to be applied.

Figure 17:
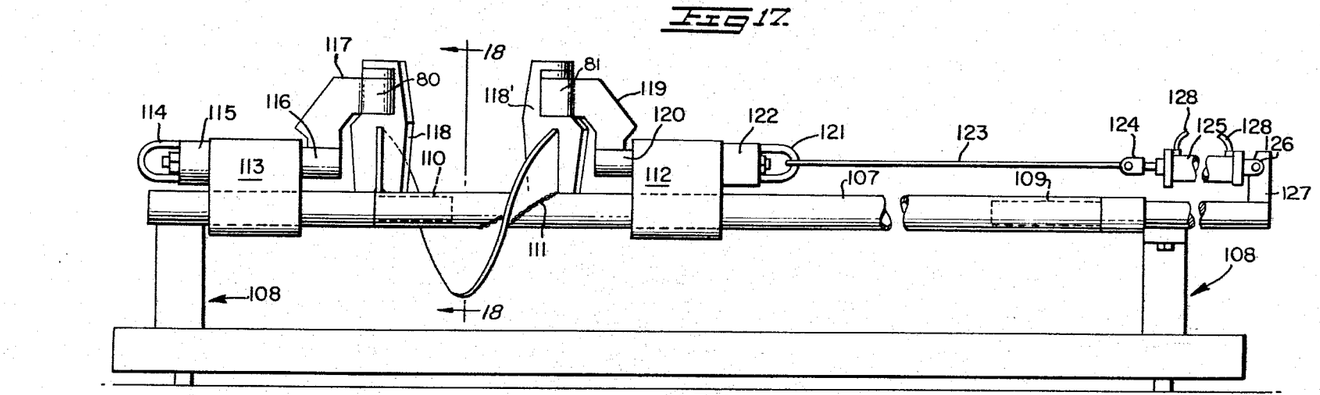
FIGURE 17 is a front elevational view of a still further modification of the present invention.
Figure 18:
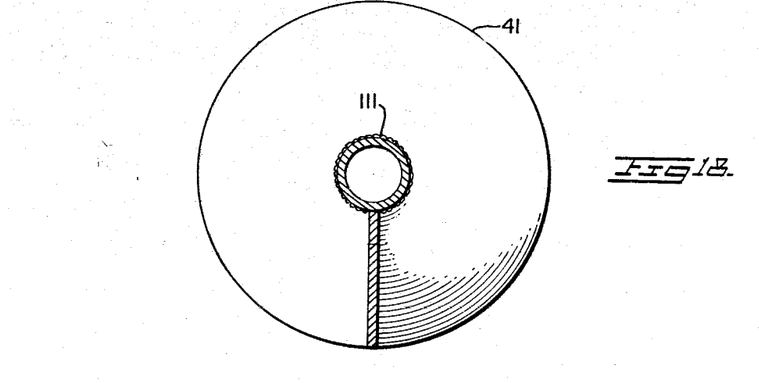
FIGURE 18 is a section taken on line 18—18 of FIGURE 17, looking in the direction of the arrows.

Shown in FIGURES 17 and 18 is a still further modification of the present invention. The device shown in this modification is designed to operate in substantially the same manner as described in connection with the previous modified structures except that in the form of the invention shown herein, the flight is adapted to be mounted directly on a shaft as it is being formed and following the formation thereof the same is secured to the shaft as by welding, brazing and the like.

In this modification of the invention, the conveyor shaft to which the flight section is to be applied is indicated by reference numeral 107. The shaft is positioned within a framework indicated generally at 108 which includes the usual base and upright members for supporting the working parts of the present invention.

A pair of stub shafts 109 and 110 are suitably mounted on the framework 108 and are adapted to receive the ends of the hollow shaft 107 and to support the same while the flight section is formed and then secured thereto as by welding, brazing and the like indicated generally at 111.

As in the previous modifications of the present invention, housings 112 and 113 encircle the shaft 107. Housing 113 shown in FIGURE 17 of the drawings may be restrained from any lateral travel on shaft 107. A tie means in the nature of a swivel hook is provided at one end of a housing 115 which is fixed to housing 113. As described previously, housing 113 is capable of rotary movement on shaft 110 and swivelly mounted in the housing is a shaft 116 which supports a clamp hanger which can be made in accordance with the structure shown and described in FIGURE 10 of the drawings. The clamp hanger includes the swiveled clamps 118 designed to operate in the same manner as set forth in the description of FIGURE 10 of the drawings. A like clamp hanger 119 is formed on shaft 120 which is swivelly retained in housing 112. A swivel hook 121 is secured in any manner to housing 122 and a pull cable 123 extends from the hook 121 to a piston rod 124 of cylinder 125. The cylinder 125 is suitably anchored as at 126 to a suitable support 127 which is fixed to the framework in any suitable manner. Suitable pressure lines 128 lead from a suitable source of pressure medium for effecting movement of the piston within the cylinder.

The operation of the device shown in FIGURE 17 of the drawings is as follows:

The external diameter of the shaft 107 is determined and likewise the length of the flight and pitch thereof which is to be applied thereto is calculated and the proper disc size having the desired external diameter is selected. Then, the central bore is formed therein in any known manner. Again, the diameter of the central bore will have been previously calculated so that when the disc has been pulled in the manner aforesaid, the same will conform to the external diameter of the shaft and the flight section will be of the desired pitch.

Following the formation of the central bore in the disc and providing a cut-out section therein as provided for in the disc shown at FIGURES 2 and 11 of the drawings, the same is clamped in the manner aforesaid to clamps 118 and 118' and a pressure medium applied to the cylinder 125 thereby pulling the housing 112 to the right as viewed in FIGURE 17 of the drawings with attendant edge of the disc clamped thereto thus forming the flight section directly onto the shaft and all that remains to be done is to weld or braze the same thereto and following the application of one flight section to the shaft, the operation can be repeated by first welding one edge of the next disc to be employed and securing the free edge of the disc to the movable clamp member 118' and repeat the pulling operation.

As can be appreciated, either left or right hand flight sections can be formed with the structure of the present invention merely by disposing the clamp hangers, clamps and the housings on the other side of the central shaft and pulling on the disc edges in the manner aforesaid to form a section of a flight. This is more clearly shown in FIGURE 19 of the drawings. It will be noted that the shafts 82' and 83' and clamp hangers 65' and 66' which are secured in any known manner to rod members 67 and 68 are disposed on the other side of the rod members 67 and 68, as compared with the position of these parts shown in FIGURE 14. With the parts arranged in this manner, and when the disc has been clamped between the hangers 65' and 66' in the manner described previously and a pulling force applied to rods 67 and 68, a right hand flight will be formed when the disc is stretched in the manner previously described.

While I have disclosed several embodiments of the present invention, it is to be understood that these embodiments are given by example only and not in a limiting sense, the scope of the present invention being determined by the objects and the claims.

What is claimed is:

1. The method of forming sectional spirial flights comprising the employment of a notched circular disc of a known outside diameter with a central bore therein, also of a known outside diameter, clamping said notched disc at each free end between a pair of opposed clamping members swivelly mounted and thereupon applying a pulling force to the said clamping members and disc held therebetween to stretch said disc to form a spiral flight section, whereby the swivelling clamping members are free to follow the line of bend imparted to the disc during pulling and cause distribution of the pulling strain, thus imparting true pitch to the flight section.

2. The method defined in claim 1 wherein the spiral flight section is formed directly onto a shaft and secured thereto following the formation thereof.

3. The method defined in claim 1 wherein the said spirial flight sections are adapted to be applied to a shaft and secured thereto with the edges thereof in overlapped relationship.

4. An apparatus for forming a sectional spiral flight from a flat circular disc having a central bore and notch formed therein comprising a frame, a pair of opposed clamping members swivelling means for said members mounted on said frame, means for securing the edges of said disc adjacent the said notch to the said pair of opposed clamping members, and power means for forcing said clamping members apart thus stretching the said disc into the form of a spirial section, and allowing for swivelling of the clamping members during stretching of the disc.

5. The apparatus defined in claim 4 wherein said pair of opposed clamping members are maintained in an upright position with respect to its associated frame by means of weights associated therewith.

6. The apparatus defined in claim 4 wherein a tubular structure is mounted in said frame and is adapted to have a sectional spiral flight formed directly thereon.

7. An apparatus for forming a spiral flight section from a flat circular disc having a central bore and a notch formed therein comprising a frame, a central shaft secured to said frame, a pair of housings swivelly mounted on said shaft, clamping members for each of said housings swivelly mounted thereon, said disc adapted to be clamped at the edges thereof formed by said notch to the said clamping members, a source of power employed for stretching the said disc while clamped to said clamping members, said power source comprising a means for forcing said clamping members away from each other and to thereby stretch said disc to form a spiral flight section.

8. The structure recited in claim 7 wherein one of said clamping members is fixed to said frame whereas the other said clamping member is laterally movable with respect to the fixed clamping member.

References Cited
UNITED STATES PATENTS 2,460,024 1/1949 McKee.
2,760,255 8/1956 Compton.
2,816,593 12/1957 Hein et al. _________ 72—378 XR BERNARD STICKNEY, Primary Examiner U.S. Cl. X.R.

29—157.3; 72—302, 378; 76—102